United States Patent [19]

La Mar

[11] Patent Number: 4,797,555

[45] Date of Patent: Jan. 10, 1989

[54] HIGH ENERGY LASER TARGET PLATE

[75] Inventor: Charles R. La Mar, Marietta, Ga.

[73] Assignee: The United States of America as represented by the Secretary of the Air Force, Washington, D.C.

[21] Appl. No.: 55,092

[22] Filed: May 28, 1987

[51] Int. Cl.$^4$ .............................. G01T 1/00; G01J 5/48
[52] U.S. Cl. .................................. 250/336.1; 374/161; 374/32
[58] Field of Search ............................ 250/336.1, 331; 374/161, 16, 32; 219/121 L

[56] References Cited

U.S. PATENT DOCUMENTS

| | | | |
|---|---|---|---|
| 3,508,056 | 4/1970 | Fricke | 250/83.3 |
| 3,738,168 | 6/1973 | Mansell | 73/190 R |
| 3,939,706 | 2/1976 | Pinson | 73/190 EW |
| 4,037,470 | 7/1977 | Mock et al. | 73/190 EW |
| 4,185,497 | 1/1980 | Decker et al. | 73/190 EW |
| 4,243,888 | 1/1981 | Gruhn et al. | 250/491 |
| 4,321,824 | 3/1982 | Martin | 73/190 EW |
| 4,381,148 | 4/1983 | Ulrich et al. | 356/213 |
| 4,436,437 | 3/1984 | Beggs et al | 374/32 |
| 4,440,506 | 4/1984 | Eitel | 374/32 |
| 4,522,511 | 6/1985 | Zimmerer | 374/32 |
| 4,606,651 | 8/1986 | Anitoff | 374/32 |
| 4,745,280 | 5/1988 | Gi et al. | 250/347 |

OTHER PUBLICATIONS

Petrova et al, "Quick Method of Determining the Radiation Density of $CO_2$ Lasers", Sov. J. Opt. Technol., vol. 43, No. 10, Oct '76, pp. 634–635.

Primary Examiner—Carolyn E. Fields
Assistant Examiner—John A. Miller
Attorney, Agent, or Firm—Richard J. Donahue; Donald J. Singer

[57] ABSTRACT

Apparatus for determining the intensity profile of a high energy laser beam. A target plate having a temperature sensitive paint on the rear surface thereof has its front surface irradiated by the laser beam under analysis. A high speed camera records the isothermal lines formed when the temperature sensitive paint changes from its solid phase to its liquid phase. Isointensity lines are then calculated from the recorded isothermal lines.

6 Claims, 1 Drawing Sheet

HIGH ENERGY LASER TARGET PLATE

STATEMENT OF GOVERNMENT INTEREST

The invention described herein may be manufactured and used by or for the Government for governmental purposes without the payment of any royalty thereon.

BACKGROUND OF THE INVENTION

The present invention relates to apparatus for determining the intensity profile of a beam of radiant energy. More particularly, the invention is concerned with a device for delineating the intensity profile of a high energy laser beam.

The development of high energy lasers, such as might be used in fusion applications, has resulted in the need for devices which will accurately determine the energy characteristics of a laser beam, including its intensity profile.

As is known, a laser beam does not exhibit a homogenous structure. The beam contains, for example, hot spots that appear within the beam profile. It is desirable therefore, to provide apparatus which can delineate the energy intensity distribution within a laser beam, and can withstand incident irradiance levels of about 50 kilowatts or greater per square centimeter during the required measurement interval. The terms irradiance and intensity are used interchangeably herein.

SUMMARY OF THE INVENTION

In accordance with the present invention, a new and improved high energy laser intensity profile delineating device comprises a target plate structure whose front surface is subjected to a laser beam undergoing analysis. The rear surface of the target plate structure is coated with a temperature sensitive paint which changes phase (solid-liquid) at a known temperature. The rear surface of the target plate is photographed over a brief time period as the front surface of the target plate is irradiated by the laser beam, to record the location of the dark line which denotes the solid/liquid interface of the paint. This dark line is a known isothermal line which can be mathematically converted to an isointensity line.

BRIEF DESCRIPTION OF THE DRAWINGS

The present invention is illustrated in the accompanying drawings in which.

DESCRIPTION OF THE PREFERRED EMBODIMENT

Figure 1:
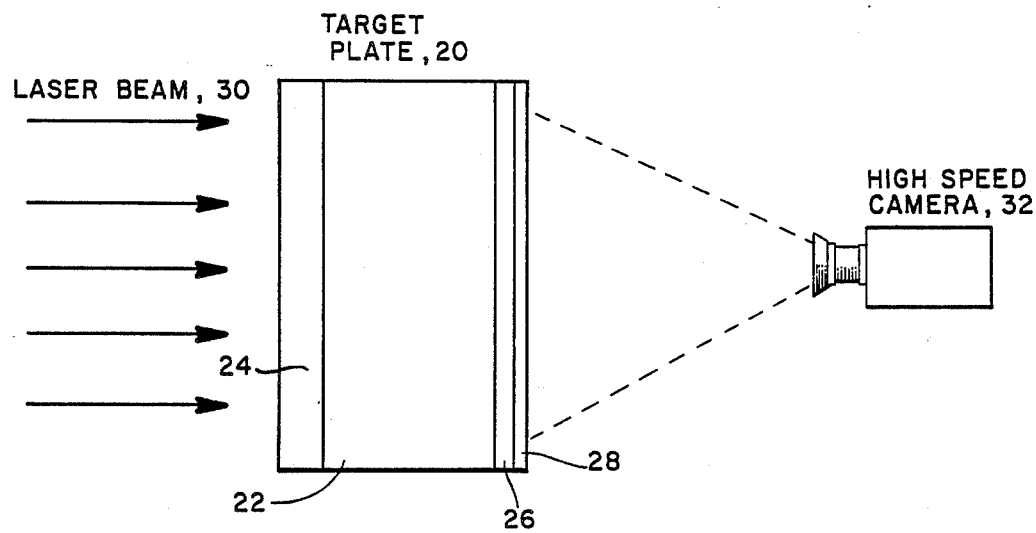
FIG. 1 is a side view of a preferred embodiment of the invention.

Critical to the development of the present invention was the recognition that if a target plate is irradiated by laser energy, the thermal response of the target plate is essentially one dimensional during the brief measurement interval of interest. Applicant has determined that a one dimensional solution of the heat transfer equation for a target plate approximates the actual three dimensional solution under the appropriate conditions. By one dimensional is meant that the temperature solution is substantially identical to the solution obtained if heat were allowed to flow only in the thickness direction of the target plate structure. The term "error" as used herein refers to the ratio of the actual three dimensional solution to the one dimensional solution.

For a gaussion beam, it may be shown by solving Poisson's three dimensional heat transfer equation, that the error $\Delta$ can be approximated by the following equation:

$$1 - \Delta < \frac{1}{t} \int_o^t \exp(-2\lambda_1^2 \, KT) dT \qquad \text{Eq. (1)}$$

where
$\lambda_1$ is $\pi/a$
t is time
K is the thermal diffisivity and
"a" is equivalent to the laser beam radius.

For beams that are not as smooth as a gaussian beam, higher order terms would be used in place of $\lambda_1$, i.e., n $\pi/a$ where n would take on the appropriate integer values required to fit the intensity profile. The values of n would correspond to the nth Fourier term in a Fourier series that fit the laser intensity profile.

If the desired accuracy is to be in the order of one percent, then the equation for selecting the time of phase change is:

$$t = 0.00102 \, a^2/k \qquad \text{Eq. (2)}$$

The particular value of "a" would be selected based on the resolving ability desired or the beam shape and size.

Equation (2) is used to determine the maximum time for the phase change to occur. This would then be used to select the plate material, plate coatings, plate thickness and phase change temperatures.

In order to obtain maximum accuracy, a full nonlinear analysis of the heat transfer problem was undertaken. The following factors were taken into account:

(1) Variation of absorbtivity with temperature.
(2) Variation of thermal conductivity and specific heat with temperature.
(3) Convective and radiative losses.
(4) The effect of the phase change material.

Taking into account the first factor is fairly straight forward. For 304 type stainless steel and many other metals, Drude theory applies and indicates a nearly linear absorbtivity variation with temperature. The effect of variation of absorbtivity with temperature is fairly small and can even be determined analytically. The fact that the effect is small implies that the coefficient does not have to be known extremely accurately.

The second and third factors can be accounted for numerically fairly easily with standard computer codes. A particular plate material that was used was first sent to a thermophysical properties laboratory, where the thermal properties of the plate were determined as a function of temperature. The diffusivity was measured using the heat pulse technique and the specific heat was measured using a differential scanning calorimeter. The accuracy of these measurements was greater than two percent. The result of the numerical analysis indicated that the effect of the variation of these quantities with temperature was small.

The fourth factor involves the characteristics of thermal paint that is used in the target plate structure. It was determined, both experimentally and theoretically, that the thermal conductivity of the paint was not a significant factor in the ultimate temperature distribution, provided that the thickness of the paint was less than a few mils. This is a fairly important result since the thermal conductivity of the paint is difficult to measure with a great deal of accuracy. However the most important factor was the specific heat of the paint as it approached phase change. This was handled numerically by using a small enough time step to insure that the specific heat curve was completely integrated during the temperature rise. The response time was defined as the time the plate reached the phase change temperature with the paint minus the time it took the plate to reach the phase change temperature without the paint. The results indicated that the thickness of the paint can be an important factor in the accuracy of the results and that it desirable to maintain a thickness on the order of 0.1 mil. If the phase change material is a metal, then the effect of its presence is extremely small.

Referring now to the drawings, FIG. 1 depicts a side view of a preferred embodiment of the targe plate 20 of the present invention. Target plate 20 comprises a metallic substrate 22, a metallic layer 24 disposed on the front surface thereof, a metallic layer 26 disposed on the rear surface thereof, and a temperature sensitive paint 28 coated on the exposed surface of metallic layer 26. In certain instances which are discussed later, metallic layer 26 may be omitted from the target plate structure and temperature sensitive paint 28 may be sprayed directly on the rear surface of metallic substrate 22.

The various components of target plate structure have not been drawn to exact scale in view of the large differences in their thicknesses. However metallic substrate 22 has a thickness in the order of 30 mils, while metallic layers 24 and 26 are in the order of 0.5 mils each.

A laser beam 30 to be analyzed is seen to irradiate the front surface of target plate 20, while a high speed camera 32 records changes which occur on the rear surface of target plate 20. In applications involving the checking of laser beams having intensities in the order of 50 kilowatts per square centimeter, the material preferrably used for the substrate 22 of the target plate structure 20 is stainless steel, while metallic layer 24, which functions as a reflecting material for laser energy, is preferrably a copper film which is electrodeposited on the surface of metallic substrate 22. Layer 26 is preferrably formed of lead.

In applications where the laser beam intensity is in the order of 600 kilowatts per square centimeter, substrate 22 may be formed of nickel, and reflecting layer 24 may be formed of silver, while in applications where the laser intensity is in the order of 900 kilowatts per square centimeter, substrate 20 may be formed of copper.

The temperature sensitive paint 28 which is sprayed on the rear surface of the target plate 20 is a paint which undergoes a change of phase (solid-liquid) at a predetermined temperature within a tolerance of one percent. This change of state is visually obvious and can be recorded by camera 32. A preferred type of such temperature sensitive paint is marketed under the name Omegalaq by Omega Engineering Incorporated.

As mentioned earlier, layer 26 may be omitted if desired, but its presence provides a second phase change material. This additional phase change provided by lead layer 26 occurs at a higher temperature than that of the selected paint and therefore occurs at a later time so as not to be confused with the observation of the phase change of the paint. Lead is usually used for this additional phase change material because of its relatively low melting point and its extreme durability. Stiffer materials, such as tin, give less accurate results due, it is believed, to thermal stresses related to heat transfer. Lead has a high thermal diffusivity and a relatively relatively low melting enthalpy which results in a higher accuracy of the measurement of the laser intensity.

The use of two phase change materials provides two measurements of the laser intensity profile. These two measurements provide the user with verificaion of initial assumptions and supporting data such as laser on-time, camera timing etc. The distinct advantage of using a temperature sensitive paint is that it allows the user a choice of phase change temperatures. This is critical when the measurement time must be made extremely short to satisfy equation (2).

In operation, the rear surface of laser target plate structure 20 is photographed while its front surface is being irradiated by laser beam 30. The dark line separating the solid phase of the paint from the liquid phase is a known isothermal line which can be converted to an isointensity line. Conversion of the recorded isothermal lines to isointensity lines is accomplished by assuming one dimensional linear heat transfer and solving the heat conduction equation for flux. This value of flux is then used as a starting point to iterively solve the nonlinear heat conduction problem. If the temperatures are kept low enough, the linear solution is accurate.

Figure 2:
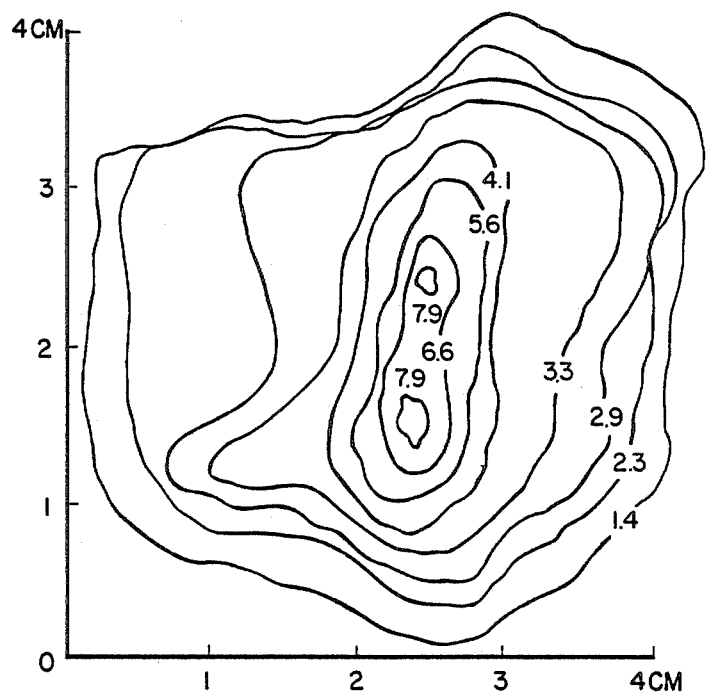
FIG. 2 is a plot of isointensity lines determined from a laser target plate constructed in accordance with the present invention.

In one experiment, the intensity profile of a laser having a wavelength of 3.8 microns was determined. Target plate 20 had a substrate 22 formed of steel with a highly reflective copper layer 24 deposited thereon. A low temperature (41° C.) paint layer 24 was sprayed on the rear surface of substrate 22. Both a video camera and a high speed camera were used to photograph the paint layer 28. The effects of the shutter time of the recording camera (8 ms for full travel) and the thickness of the paint layer (0.1 mil) were small enough to neglect. FIG. 2 illustrates the isointensity lines that were calculated from the enhanced video pictures taken of this experiment. The total power of the laser beam approximated 50 kilowatts and the calculated isointensity contour line values are given in kilowatts per square centimeter.

It will be understood that various changes in the detailed materials and arrangement of parts which have been herein described and illustrated in order to explain the nature of the invention may be made by those skilled in the art without departing from the spirit and scope of the invention as defined in the appended claims.

I claim:

1. Apparatus for determining the intensity profile of a beam of radiant energy comprising:
   a metallic plate substrate having a first planar surface and an opposed second planar surface;
   a first metallic layer disposed on said first surface of said substrate and being positioned to be irradiated by said beam of radiant energy;
   a layer of temperature sensitive paint disposed on said second surface of said substrate and undergoing a change of phase from a solid phase to a liquid phase when subjected to a predetermined temperature;
   and optical recording means for recording an indication of the intensity profile of said beam, said optical recording means being focused on said layer of temperature sensitive paint.

2. Apparatus as defined in claim 1 wherein said metallic plate substrate is formed of steel and said first metallic layer is formed of copper electrodeposited on said steel.

3. Apparatus for determining the intensity profile of a high intensity laser beam comprising:
- a metallic plate substrate having a first planar surface and an opposed second planar surface;
- a first metallic layer disposed on said first surface of said substrate and being positioned to be irradiated by said laser beam;
- a second metallic layer disposed on said second surface of sais substrate;
- a layer of temperature sensitive paint disposed on the exposed surface of said second metallic layer and undergoing a change of phase from a solid phase to a liquid phase when subjected to a predetermined temperature;
- and optical recording means for recording an indication of the intensity profile of said beam, said optical recording means being focused on said layer of temperature sensitive paint.

4. Apparatus as defined in claim 3 wherein said metallic plate substrate is formed of steel and said second metallic layer is formed of lead.

5. Apparatus as defined in claim 3 wherein said metallic plate substrate is formed of nickel.

6. Apparatus as defined in claim 3 wherein said metallic plate substrate is formed of copper and said first metallic layer is formed of silver.

* * * * *